United States Patent
La Salla et al.

(10) Patent No.: US 10,488,510 B2
(45) Date of Patent: Nov. 26, 2019

(54) PREDICTIVE PROBABLE CAUSE SYSTEM AND UNMANNED VEHICLES USING THE SAME

(71) Applicant: Leah La Salla, Austin, TX (US)

(72) Inventors: Leah La Salla, Austin, TX (US); Josè La Placa Amigò, Austin, TX (US)

(73) Assignee: Leah La Salla, Austin, TX (US)

( * ) Notice: Subject to any disclaimer, the term of this patent is extended or adjusted under 35 U.S.C. 154(b) by 0 days.

(21) Appl. No.: 15/886,731

(22) Filed: Feb. 1, 2018

(65) Prior Publication Data

US 2018/0217249 A1 Aug. 2, 2018

Related U.S. Application Data

(60) Provisional application No. 62/453,810, filed on Feb. 2, 2017, provisional application No. 62/469,955, filed on Mar. 10, 2017, provisional application No. 62/534,075, filed on Jul. 18, 2017.

(51) Int. Cl.
| | |
|---|---|
| *G01S 13/86* | (2006.01) |
| *G06K 9/00* | (2006.01) |
| *G01S 13/88* | (2006.01) |
| *G01S 13/93* | (2006.01) |
| *G06T 15/20* | (2011.01) |
| *G06T 19/00* | (2011.01) |
| *G01S 13/89* | (2006.01) |

(52) U.S. Cl.
CPC .......... *G01S 13/867* (2013.01); *G01S 13/887* (2013.01); *G06K 9/00228* (2013.01); *G06K 9/00288* (2013.01); *G06K 9/00664* (2013.01); *G01S 13/888* (2013.01); *G01S 13/89* (2013.01); *G01S 13/93* (2013.01); *G01S 13/9303* (2013.01); *G06T 15/20* (2013.01); *G06T 19/006* (2013.01)

(58) Field of Classification Search
CPC ...... G01S 13/867; G01S 13/887; G01S 13/93; G06K 9/00228; G06K 9/00288; G06T 15/20; G06T 19/006
USPC .......................................................... 342/55
See application file for complete search history.

(56) References Cited

U.S. PATENT DOCUMENTS

| | | | |
|---|---|---|---|
| 7,831,932 B2 | 11/2010 | Josephsoon | |
| 7,861,188 B2 | 12/2010 | Josephsoon | |
| 8,788,966 B2 | 7/2014 | Josephsoon | |
| 2017/0124407 A1* | 5/2017 | Micks | B60W 40/08 |
| 2017/0371338 A1* | 12/2017 | Kamata | G05D 1/0214 |
| 2018/0011180 A1* | 1/2018 | Warnick | H01Q 3/34 |
| 2018/0067204 A1* | 3/2018 | Frizzell | G01S 13/867 |

* cited by examiner

*Primary Examiner* — Frank J McGue

(74) *Attorney, Agent, or Firm* — Intellectual Property Law Group LLP

(57) ABSTRACT

An unmanned vehicle includes WiFi sensors, which generate data by reflecting electromagnetic waves off an object within a vicinity of the unmanned vehicle. WiFi data processing circuitry receives the data generated by the WiFi sensors and analyzes the data to determine a characteristic of the object.

8 Claims, 9 Drawing Sheets

PREDICTIVE PROBABLE CAUSE SYSTEM AND UNMANNED VEHICLES USING THE SAME

CROSS-REFERENCE TO RELATED APPLICATIONS

This application claims the benefit of priority based upon co-pending and commonly owned U.S. Provisional Application Serial No. 62/453,810, filed Feb. 2, 2017, and entitled Biometric Feedback and Augmented Reality Device and System for Operating an Unmanned Vehicle; U.S. Provisional Application Serial No. 62/469,955, filed Mar. 10, 2017, and entitled Biometric Feedback and Augmented Reality Device and System for Operating a Vehicle; and U.S. Provisional Application Serial No. 62/534,075, filed Jul. 18, 2017, and entitled Predictive Probable Cause System and Unmanned Vehicles Using the Same; all of which are incorporated herein in their entireties by reference for all purposes.

FIELD OF THE INVENTION

The present invention relates in general to vehicle control systems and in particular to predictive probable cause systems and unmanned vehicles using the same.

BACKGROUND OF THE INVENTION

"Teleoperation" or "telepresence operational control" generally refers to the manipulation of physical objects by an operator from a distance. Among other things, teleoperation allows an operator to use a remote implement, such as an unmanned vehicle, to perform a task using a human-computer interface (HCI). Teleoperation advantageously allows an operator to implement remote tasks in hostile or inaccessible environments, where human exposure might be hazardous but human intelligence is nonetheless required.

A number of HCIs exist, that will allow a human operator to operate a remote vehicle, such as an aerial drone. Some particular HCIs respond to motion of the human body. Generally, these systems monitor spatial information to detect motion of given parts of the human body, such as the hands, arms, legs, or eyes, associate specific body motions with particular vehicle operational commands, and then generate those commands for controlling the remote vehicle.

Another more specific form of HCI is the brain-computer interface (BCI). BCI generally senses electrical brain activity and translates that brain activity into computer commands. One approach uses electroencephalogram (EEG) data captured using a standard sensor cap, similar to a swimming cap. Another approach uses an electromagnetic-gram (EMG) to detect brain activity. In both cases, off-the-shelf hardware is available, which is relatively inexpensive and non-invasive.

However, BCI is still subject to some significant disadvantages, and currently insufficient alone to support control of a remote vehicle. Among other things, the human operator must maintain concentration to maintain vehicle control and significant training of the system is required.

Augmented reality (AR) systems combine sensor information with computer generated information to generate an enhanced user interface. In particular, in the AR technique known as synthetic imagery, computer-generated information, such as images and text, overlays real-time information provided by a sensor. For example, terrain information may overlay a live video feed from a vehicle to allow remote operator to navigate that terrain with a reduced risk of collision. In addition, AR systems can be immersive, for example using a hologram, which allows the user to experience the environment in which the sensor is operating.

Currently, no interface exists that combines biometric data (i.e., HCI data from body movements and BCI) with an AR holographic display device and allows an operator to remotely control an unmanned vehicle (UV), such as an unmanned aerial vehicle (UAV).

Unmanned vehicles have numerous applications in the law enforcement and military fields; however, while they have been successfully used to avoid dangerous confrontations and locate weapons and contraband in open environments, they are still subject to some serious limitations. For example, an unmanned vehicle, such as an aerial drone, may allow law enforcement officers to safely reconnoiter the outside of a building, but not the identification of individuals and object within the building. As a result, officers are often unable to determine whether entry into a building or other structure presents a significant personal risk, whether they have probable cause to enter the building immediately, and/or whether they have sufficient information to request a search warrant.

In order to achieve full autonomy, an unmanned vehicle typically needs to possess the ability to explore its environment without user-intervention, build a reliable map of the environment, and localize itself within the map. Simultaneous Localization and Mapping (SLAM) advantageously allows an operator to interact in complex or difficult to navigate environments by reducing or eliminating the piloting burden.

Cycle counting is the process of auditing inventory at distribution centers or warehouses. In a cycle count, a section of the inventory in a specific location of a warehouse is counted to measure inventory accuracy relative to the records in the warehouse management system (WMS). Contrary to physical inventory, cycle counting requires only the section being cycle counted to be measured, as opposed to physical inventory where the full inventory of the warehouse is measured during a time in which the operation of the warehouse would be stopped.

Computerized object identification and recognition generally refers to the ability for a computer system to be able to match objects against a corpus of objects previously provided. Among other things, computerized object identification and recognition advantageously allows an operator to label a large number of objects without requiring their intervention.

Currently no system exists that combines SLAM with computerized object recognition and identification that allows one or more remotely controlled UAVs to perform inventory cycle counting.

SUMMARY

The principles of the present invention are generally embodied in an unmanned vehicle including WiFi sensors, which generate data by reflecting electromagnetic waves off an object within a vicinity of the unmanned vehicle. WiFi data processing circuitry receives the data generated by the WiFi sensors and analyzes the data to determine a characteristic of the object.

In particular embodiments of the present principles, the WiFi sensors reflect electromagnetic waves of objects disposed behind a structure for detecting presence of individuals, weapons, or contraband not visible to the human eye or conventional imaging systems, such as video cameras. The WiFi sensors may also be used to generate planar or three dimensional maps of objects within the vicinity of the unmanned vehicle.

Additional embodiment of the present inventive principles include an imaging device, such as a still or video camera, and processing circuitry for providing facial recognition and/or anomaly detection using data generated by the imaging device.

The embodiments of the present principles provide significant advantages over existing surveillance technologies. Among other things, the WiFi radar capabilities allow law enforcement and military personnel to safely detect the presence of individuals, weapons, and or contraband behind building walls and other structures. Facial recognition capability, supported by a wireless connection to public and private databases, allows individuals to be identified. In addition, anomaly detection allows for the detection of unusual patterns of behavior, which may indicate criminal activity.

Additional features and benefits of the present invention will become apparent from the detailed description, figures and claims set forth below.

BRIEF DESCRIPTION OF THE DRAWINGS

The exemplary embodiments and advantages of the present invention will be understood more fully from the descriptions given below and from the accompanying drawings of various embodiments of the invention, which, however, should not be taken to limit the invention to the specific embodiments, but are for explanation and understanding only.

DETAILED DESCRIPTION OF THE INVENTION

The principles of the present invention and their advantages are best understood by referring to the illustrated embodiment depicted in FIGS. 1-6 of the drawings, in which like numbers designate like parts. Those of ordinary skilled in the art will realize that the following detailed description is illustrative only and is not intended to be in any way limiting. Other embodiments of the present invention will readily suggest themselves to such skilled persons having the benefit of this disclosure. Reference will now be made in detail to implementations of the exemplary embodiments of the present invention as illustrated in the accompanying drawings.

Figure 1:
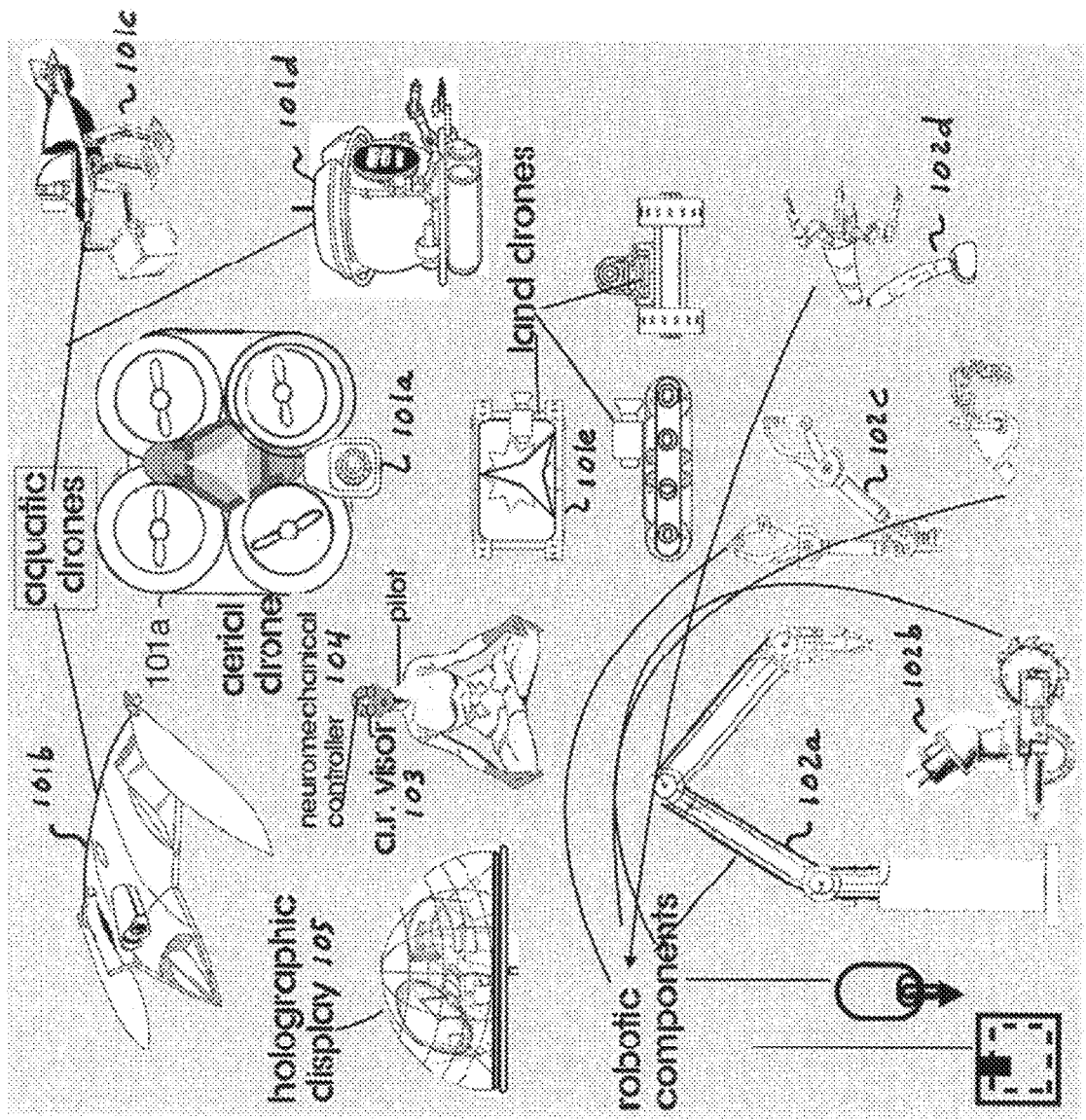
FIG. 1 is a high-level conceptual block diagram of a representative vehicle control system embodying the principles of the present invention.

FIG. 1 is a diagram of an exemplary system 100 suitable for describing the principles of the present invention. As shown in FIG. 1, system 100 includes a representative set of unmanned vehicles (UMVs) 101, including an aerial drone 101a, a set of aquatic drones 101b-101d, and a land drone 101e. The UMVs shown in FIG. 1 are representative only, and in alternate embodiments the type and function of the UMVs may vary.

Each UMV 101 may be integrated with a robotic subsystem, such as a robotic arm or actuator for capturing objects or other implements or tools. In FIG. 1, a set of exemplary robotic subsystems 102a-102e are shown for reference. One or more robotic subsystems 102 carried on an associated UMV 101 support teleoperations.

According to the principles of the present invention, an operator (pilot) controls a UMV 101 and associated implement 102 through an augmented reality (AR) visor 103 and an neuromechanical controller 104 including a sensor cap, which are discussed in further detail below. Generally, a combination of body gestures, head and eye movements, and electrical brain activity generates a 3D holographic display 105 on AR visor 103. The 3D holographic display allows telepresence control of the UMV 101, the implement 102, or both.

Figure 2A:
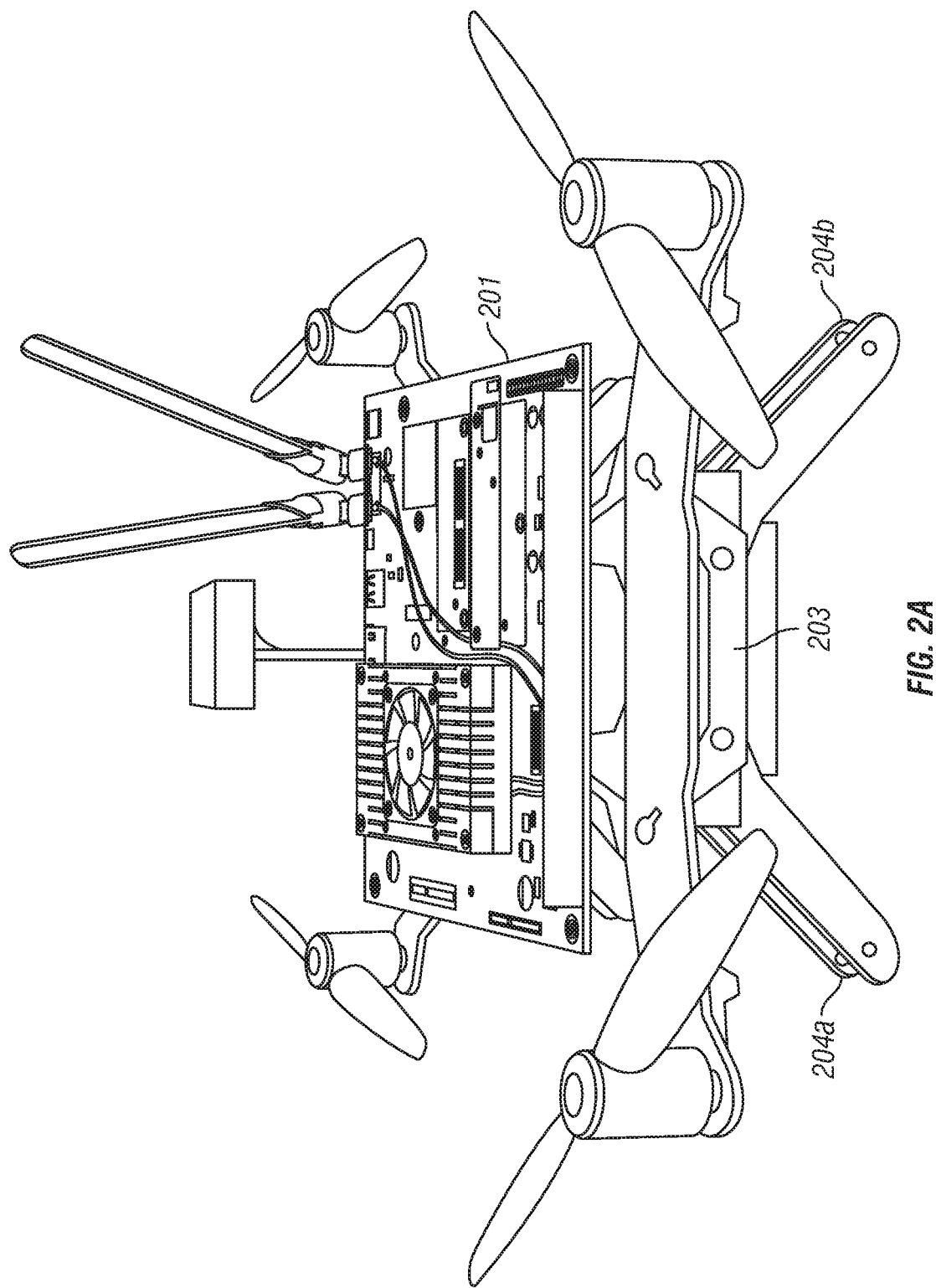
FIG. 2A is a perspective view of an aerial unmanned vehicle (drone) embodying the principles of the present invention.
Figure 2B:
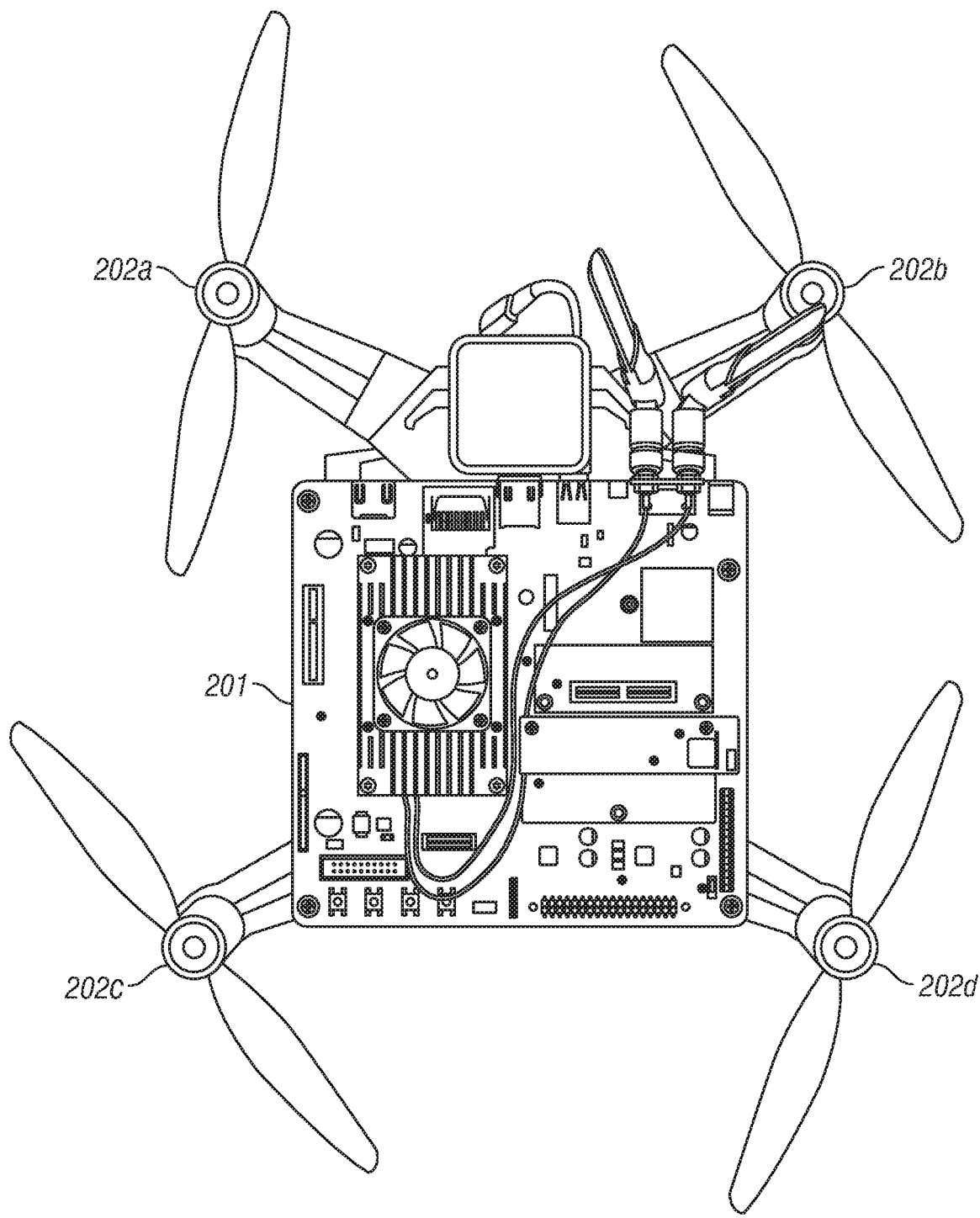
FIG. 2B is a top plan view of the vehicle of FIG. 2A.
Figure 2C:
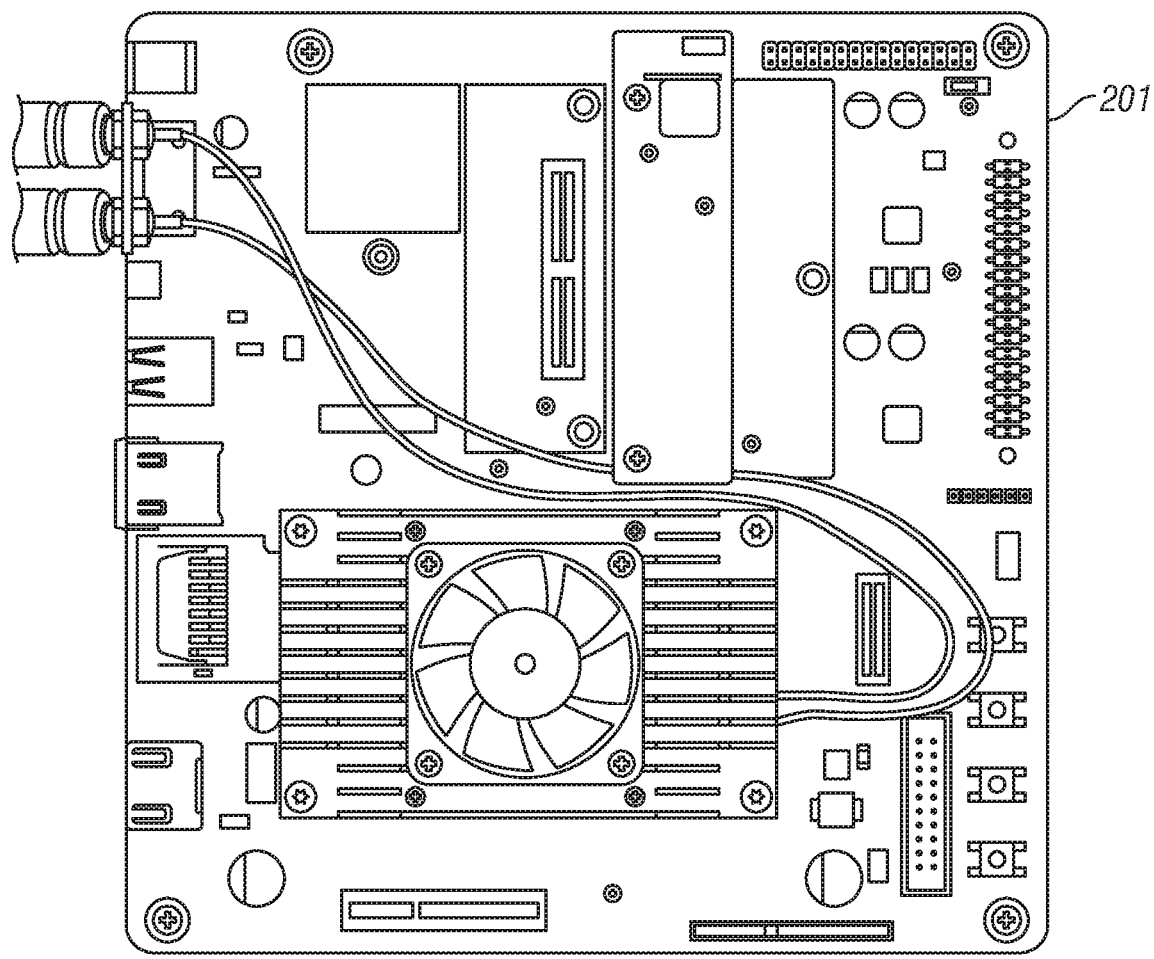
FIG. 2C is a more detailed plan view of the upper surface of the vehicle platform of FIG. 2A, which emphasizes the electronic control circuitry.
Figure 2D:
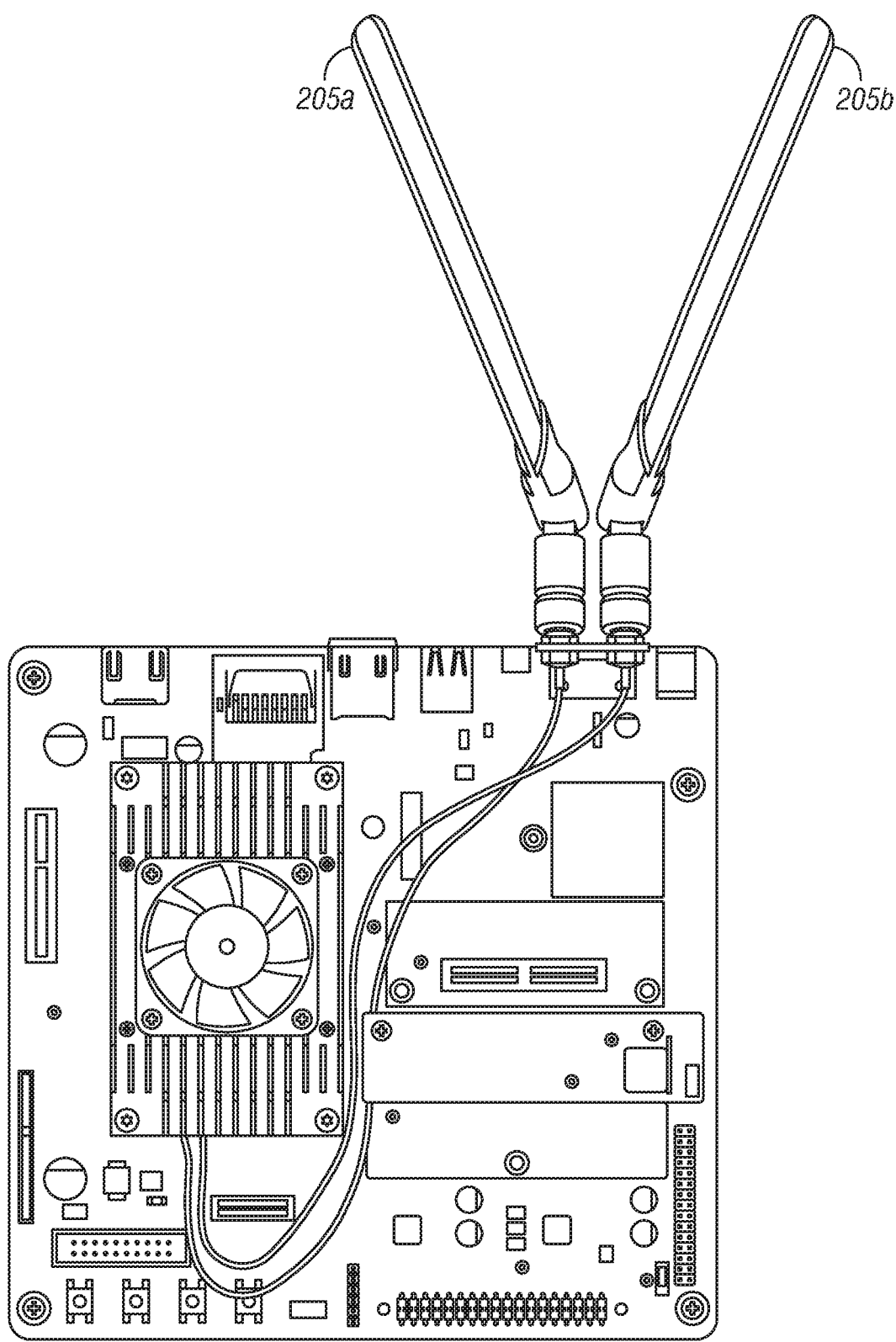
FIG. 2D is a top plan view of the vehicle platform of FIG. 2A, with the rotor subsystems removed to emphasize a pair of interacting robotic actuators (capture arms)

FIGS. 2A-2D are more detailed diagrams of a representative aerial drone UMV 101 suitable for describing the principles of the present invention. In the illustrated embodiment, the aerial drone is a 3DR Solo aerial drone or "quadcopter", which includes a platform 201 supporting the drone electronics and four (4) rotors 202a-202d driven by corresponding electrical motors. Platform 201 is in turn supported by a frame 203 including a set of legs, two of which are shown in FIG. 2A as 204a and 204b. A pair of servo-controlled opposing actuators (capture arms) 205a-205b allows objects to be grasped by teleoperation.

A drone-side object-mapping sensor is mounted on platform 201, and is, for example, an Intel three-dimensional computer vision object mapping sensor. The object mapping sensor is depth-aware and maps the difference between physical objects and negative space (i.e., space that does not contain objects within the valid flight paths of the drone) within the sensor field of view. In other words, the drone-side object-mapping sensor detects spaces in which the drone can be maneuvered.

In one embodiment, the drone includes an adaptive autopilot, which implements onboard artificial (AI) intelligence for adjusting rotor speeds to maintain a stable altitude. The adaptive autopilot, for example, accounts for changes in wind speed, wind gusts, and air pressure, and in some embodiments, implements 360degree collision avoidance. In embodiments including collision avoidance, the adaptive autopilot may slow down or stop the drone, or alter the path of the drone, when a potential impact with another object is detected. Furthermore, if, for some reason, the drone loses contact with the operator, the drone will wait at a safe location or hover at a safe height until contact is re-established or batteries run low in which case it will go to a designated safety area.

The drone-side object-mapping sensor is a mid-range sensor, in contrast to the super short-range sensor provided by AR visor 103. Generally, a mid-range sensor has a field of view of between a few yards and several hundred yards. AR visor 103 is accurate up to two arms' length away and can distinguish human hands and gestures. AR visor 103 also incorporates infrared light spectrum sensing and is depth aware. AR visor 103 is a forwardfacing visor with a set of sensor, which provides pilot-side object-mapping and negative space awareness in the super short range.

In the one embodiment, AR visor 103 is a Microsoft Hololens, which includes an object mapping sensor that is negative space aware and operates in the super-short range. In alternate embodiments, other visors may be used, such as an Epson Moverio visor. According to the present inventive principles, additional functionality is programmed into the AR visor, which supports custom gesture control for controlling the robotics onboard the drone, such as the capture arms shown in FIG. 2D. Typically, the visor-side object-mapping sensor is physically mounted on the front of the visor assembly and is provided, along with firmware and drivers, by the visor OEM.

Robotics 205 may be one of a number of commercially available servomechanical components controlled by a servo motor and associated servo control circuitry, which perform basic mechanical tasks. Multiple types of robotics 205 may be integrated into a given unmanned vehicle 101, depending on the intended task or mission. Exemplary servomechanical components suitable for use as robotics 205 include servo-grippers, which are gripper clamps that grab and release objects, and servo-turrets, which are simple turret heads that rotate to engage a tool-head. Other examples include servo-hatches, which are doors that open and close under servomotor actuation, and servo-triggers, which are servomotor-controlled on/off switches. Electronic servomotor controls are available, for example, from Arduino.

In the illustrated embodiment, which includes opposing actuators 205a-205b, a hand-grab gesture by the operator will be detected by AR visor 103 and translated into commands that cause the capture arms to grab onto an object within their reach. In particular, when the operator reaches out with hand and emulates grabbing an object with a fist, that gesture is detected by the AR headset and mapped to a servo motor on the drone. In turn, the servo motor causes the opposing capture arms to close and grab the object. The basic firmware provided by the visor OEM is modified, according to the present principles, to detect custom hand gestures and drive the servo onboard the drone to implement the desired robotic functions.

AR visor 103 also implements predictive gaze and predictive head tracking. Predictive gaze tracking and predictive head tracking allow head and eye movements of the operator to be translated into motions of the drone. In general, predictive gaze and head tracking are based on research that has shown that during certain human actions and gestures there are certain universalities in the way the eyes move and gaze and the head moves that indicate that that an action is being contemplated and about to be taken.

Head tracking is performed using a gyroscopic sensor on AR visor 103, which detects head position and movements, such as the movement of the operator's head in a particular direction. Gaze tracking is performed by inward-facing sensors on AR visor 103, which monitor the operator's eyes and/or pupils with a degree of accuracy and nuance that varies between visor OEMs. Among other things, the gaze tracking sensors allow for adjustment to accommodate for a given individual's eye position and shape, track eye movement to determine the target of the gaze, and discern gaze from focus by monitoring changes in the irises or pupils.

In the one embodiment, predictive gaze and head tracking is implemented using software from Quantum Interface, LLC, Austin, Tex., and described in U.S. Pat. Nos. 7,831,932, 7,861,188, and 8,788,966, all of which are incorporated herein in their entirety for all purposes. This software and firmware advantageously observes and interprets the operator's head motion to infer the operator's intention and applies predicative adjustments to the interactivity, presentation, and options of an interface, such as AR visor 103. With regards to predictive gaze tracking, this software and firmware observes and interprets eye (pupil/iris) behavior to infer the operator's intention or target of interest and applies predicative adjustments predicative adjustments to the interactivity, presentation, and option of an interface, such as AR visor 103.

In the one embodiment, the Quantum Interface predictive head and gaze tracking software is used to produce, confirm, refine, nuance, and provide supplemental navigation control. For example, predictive head and gaze tracking may be used to intuitively increase or decrease the drone's flight speed or altitude and/or to confirm changes in flight direction if the system software determines, from the emotive sensors, that the operator is engaged in flying the drone. In addition, the predictive gaze software may be used to confirm, refine, and nuance the coarse drone-side sensor controls, such as to allow mapping of the drone's object-mapping sensor (camera) to track the operator's gaze.

In the one embodiment, neuromechanical controller 104, which interfaces with AR visor 103, includes electroencephalogram (EEG) and electromagneticgram (EMG) sensors (the "emotive sensors"). The emotive sensors may be commercially available sensors incorporated into a skull or swim cap, which cover the skull of the operator when in use. As known in the art, the EEG and EMG sensors measure the electrical impulses on the head. In addition, emotive sensors are used to measure operator concentration.

The information from neuromechanical 104 controller is passed, along with the information from the predictive gaze and head tracking function, to AR visor 103 to the drone 101. At the drone, the information from AR visor 103 overrides the manual controls that normally fly the drone.

Each operator trains neuromechanical controller 104 to recognize certain brain patterns during the operation of the drone. In other words, neuromechanical controller 104 is specific to each operator. In an alternate embodiment, each potential operator of the drone has his or her own neuromechanical controller 104, which interfaces with AR visor 103 to allow swapping.

AR visor 103 implements 3D holographic renderings using the predictive gaze and head tracking and emotive sensing features discussed above. More specifically, a hologram ("SLAMMSphere") is generated based on the position of the operator's head and eyes, along with information from the emotive sensors regarding the operator's frame of mind (i.e., what the operator is focused on doing at the time.) The SLAMMSphere presents the space in which the drone is located as a 3D hologram on the AR visor, which allows the operator to navigate the drone and experience a simulated sense of flying.

The SLAMMSphere, in the illustrated embodiment, operates in active perspective, planar perspective, and transitional perspective modes. In the active perspective mode, the 3D hologram is generated by AR visor 103. In the planar perspective mode, a 2D display is generated, with the AR visor transitioning between the 3D and planar perspectives in the transitional perspective mode. AR visor 103 also displays submenus, responsive to gaze and head tracking, which provide, for example, drone status and navigational information.

The SLAMMSphere provides "a blended physical presence" wherein the human operator (pilot) directly interacts with the drone's physical environment remotely via a holographic medium in real time. The blended physical presence refers to a state wherein the operator can "be in two places at once" through the ability to freely interact physically with objects at either the operator's own location or the drone's location at will.

In operation, gaze and head motion inputs control drone pitch, yaw, and roll. Emotive (BRI) inputs control up/down, forward/back, and side-to-side motions of the drone. Operation of the onboard robotic 205 is controlled by hand and body gestures within the super-short range of AR visor 103. In each case, the software may be customized depending on the intended mission or task. For example, a given task may require a particular set of hand gestures mapped to the control circuits onboard the drone that control the servomechanical systems.

Figure 3:
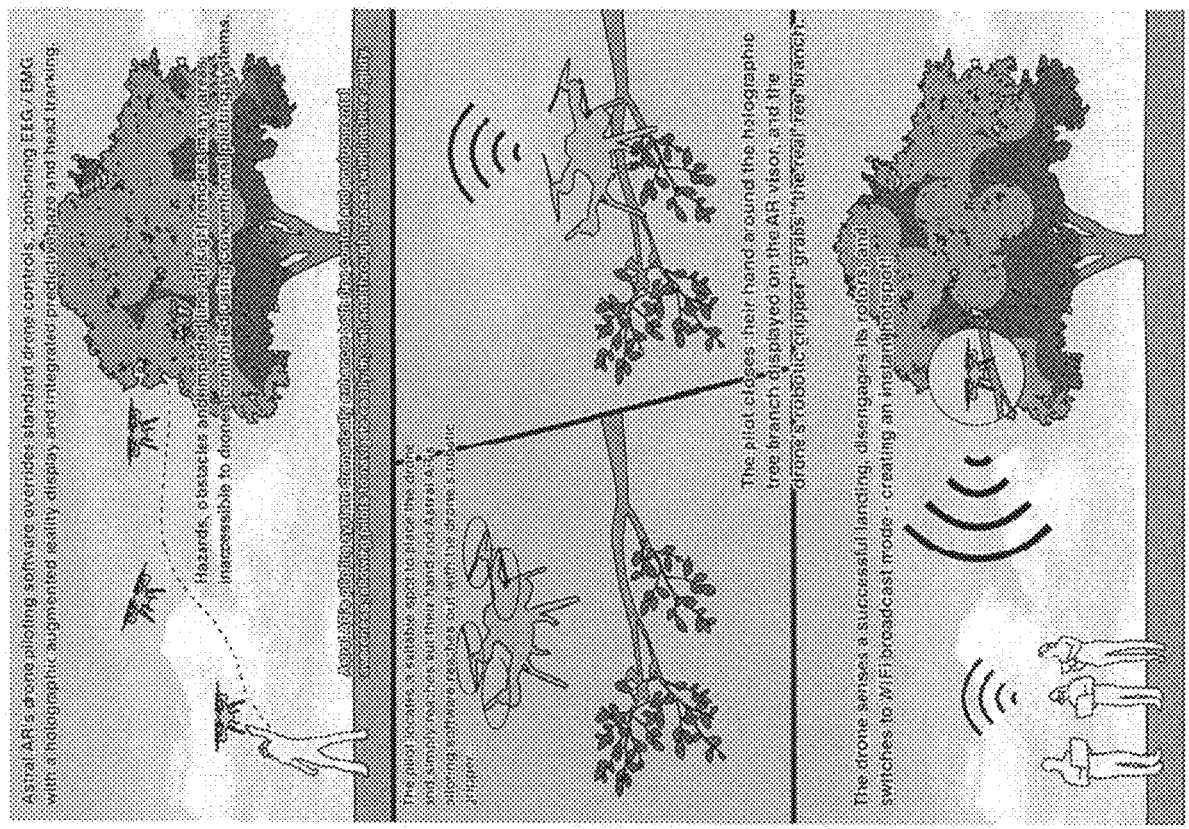
FIG. 3 is a conceptual diagram showing an exemplary usage of the aerial vehicle of FIG. 2A as a mobile wireless access point.

FIG. 3 illustrates an exemplary use of the principles of the present invention. In this example, the operator, using AR visor 103 and neuromechanical controller 104 flies an aerial drone 101 towards a tree and lands on a selected branch. Using gestures, the operator then affixes the drone to the tree branch using robotics 205. Once the drone is secure, the rotors are shut-down and one or more boosting antennas may be extended under servomechanical control. The drone can then act as a wireless access point (hotspot) or repeater, cellular telephone base station, or other communications nodes, depending on the electronics being carried on platform 201. Once the drone has completed its task, the rotors are re-engaged and the drone allowed to achieve a stable hover, after which robotics 205 are released.

In some embodiments of the present principles, the drone may include a universal charging arm (charging hook) that may take of form of a cable-car or ski-lift hook. When the drone is proximate a charging surface, the charging arm is extended using a servo trigger and/or servo or step motor to engage the charging surface. The rotors then disengage and software initiates a battery recharging functionality for recharging the drone batteries. The software monitors the charging progress and disengages the recharging functionality on completion. The rotors are re-engaged and the charging arm is disengaged from the charging surface once the drone has achieved a stable hover.

Another embodiment is a rescue drone used for search and rescue operations over open oceans. In this case, the drone has a servo hatch allowing access to a reloadable payload, such as a survival kit including a six-person self-inflating life raft. This drone may be one of a fleet of like drones. When one drone in the fleet detects human survivors (e.g., migrants or refugees), it summons nearby members of the fleet, locates itself near the survivors, and opens its hatch to release its payload in easy reach of the survivors. A human operator may also be alerted to assume manual control over the drone.

A set of robotics such as a servo-gripper or servo-turret may be integrated along with a servo-cutter to provide a "flying jaws of life" embodiment. Here, the drone attaches itself to a structure, such as a bracing strut. The operator can then position and engage the servo-cutter as required to clear debris, create emergency exits, clear entanglements, and so on. The collision avoidance functionality may be overridden by the operator, to allow the drone to approach objects, up to and including performing maneuvers that may result in the destruction of the drone.

A fire-fighting embodiment or "fire-drone" may include a reloadable payload, such as a servo controlled canister of fire-retardant foam. Custom programming may allow the drone to automatically detect human survivors within a structure. For wildfire operations, a fleet of like fire-drones may be deployed. In either case, when a human survivor is detected, the drone or drones are capable of automatically discharging their payloads. Alternatively, the operator can manually discharge the payload at a particular position.

A further representative embodiment is a tow-drone, which includes a servogripper and extendable arm for retrieving, reclaiming, and towing lost, broken, disabled, and/or distressed drones. Similarly, a drone including a servo-turret, servo-hatch, and/or servo-gripper may be deployed for the general purpose of tightening, loosing, extracting and retrieving objects.

In summary, embodiments of the principles of the present invention allow for the control of unmanned vehicles, including a wide range of different aerial, land and aquatic drones. The use of augmented reality provides the operator with an immersive user experience that gives the operator the feeling of actually flying, while at the same time avoiding the vertigo commonly experienced with virtual reality systems.

Systems embodying the present inventive principles are applicable to a wide range of situations where human intelligence is required, but exposure of an actual human to the environment could be hazardous. Such situations may arise in both civilian and military contexts, including battlefield surveillance, mine disposal, oil rig maintenance, skyscraper maintenance, firefighting mapping of survivors, and search and rescue operations on land and sea, among others. For example, one could send a drone into a burning building, find anybody trapped in there, dispense (or drop) protective fire retardant foam, and provide the safest route to take for the rescue personnel.

Figure 4:
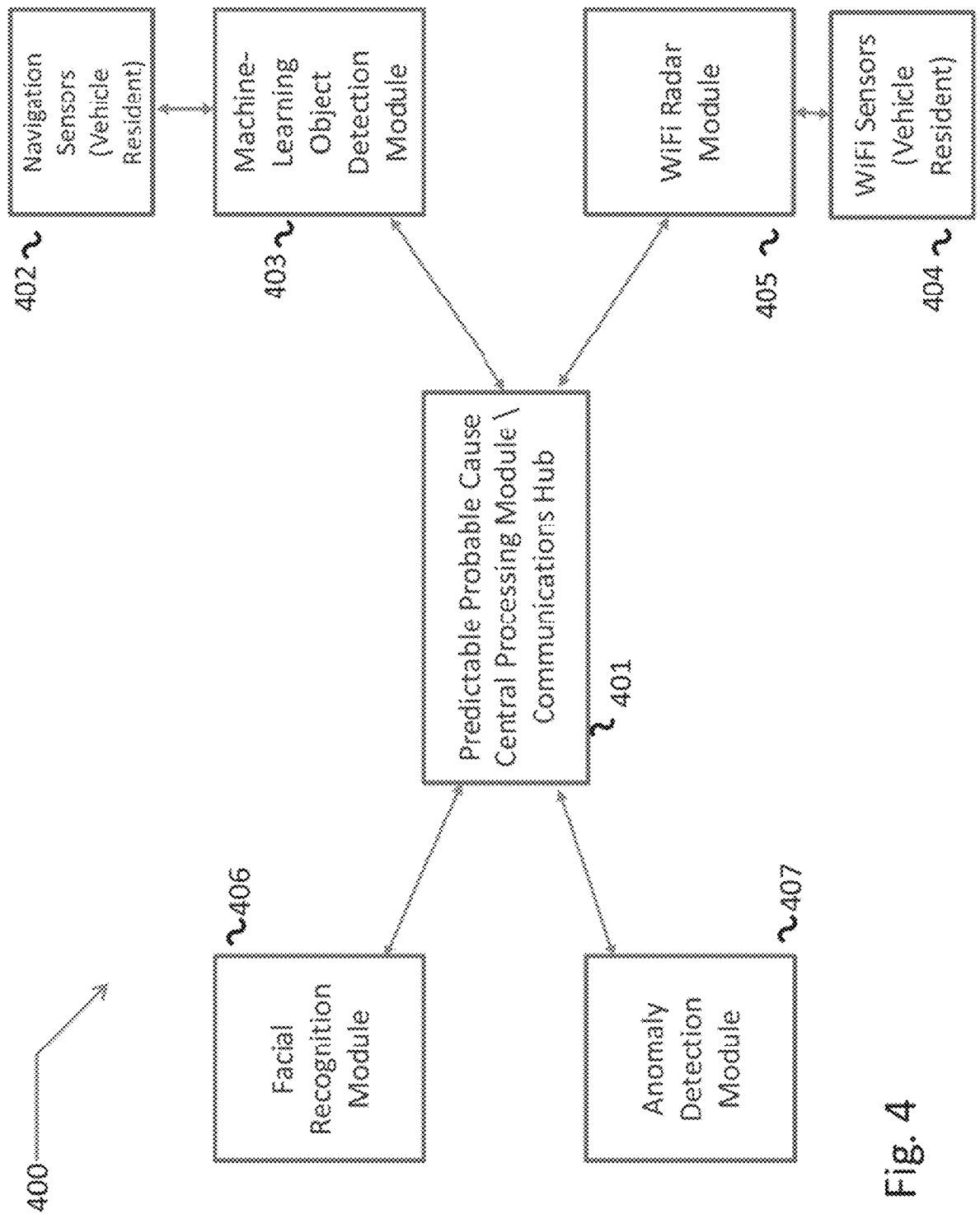
FIG. 4 is a functional block diagram of a representative predictive probable cause system according to the principles of the present invention and suitable for use in an unmanned vehicle, such as one of those shown in FIG. 1.

FIG. 4 is a high-level block diagram of a predictive probable cause system 400 suitable for use in conjunction with one or more of the unmanned vehicles 101 shown in FIG. 1. For purposes of the present discussion, "predictive probable cause" describes the ability of a system to support reconnaissance through a building wall, vehicle body, or other physical barrier, which otherwise impedes law enforcement or military personnel from fully evaluating a potentially dangerous situation. In addition, predictive probable cause systems embodying the present principles allow law enforcement personal to determine whether probable cause exists to enter a building immediately or to obtain sufficient information to request a search warrant.

Moreover, while the following discussion describes system 100 in terms of integrated software/hardware modules, in actual embodiments the partitioning of hardware and software processing resources may vary. For example, while certain modules may be based on one or more hardware processing resources (e.g., a microprocessor, microcontroller, or digital signal processor), along with associated firmware and/or software, which are resident on an unmanned vehicle, other hardware and/or software resources may be resident on a user base station in communication with the unmanned vehicle. In other words, the number and location of the various hardware and software processing resources may vary between embodiments without deviating from the principles of the present invention.

In the illustrated embodiment of FIG. 4, system 400 is based on a predictable probable cause central processing module/communications hub 401, which resides on the vehicle 101. Central processing module/communications hub 401 controls the adaptive autopilot and piloting systems described above and provides and supports two-way wireless communications links with user terminals (not shown). In one embodiment, central processing module/communications hub 401 is based on an Intel Atom x7-8700 Quad-Core processor operating in conjunction with 4 GB memory (e.g., RAM) and 32 GB storage (e.g., Flash). In the illustrated embodiment, central processing module/communications hub 401 communicates with off-vehicle systems, including command and control systems, through Wi-Fi and Bluetooth wireless communications. Central processing module/communications hub 401 operates, for example, using an Ubuntu 16.04 operating system.

A set of navigation sensors 402 detect objects in a 360 degree field around the vehicle 101 in support of the adaptive autopilot and piloting systems. In the illustrated embodiment, navigation sensors 402 include at least one camera, such as an Intel RealSense ZR300 Depth Camera. In alternate embodiments, other types of sensors may be used, which support the determination of object features such as size, shape, distance from the vehicle, color, and surface characteristics, among other things. Examples include infrared (IR), acoustic, and/or laser sensors (e.g., LIDAR). Other environment sensors include an inertial measurement unit, barometric pressure sensor, GPS receiver, and proximity sensor.

Navigation sensors 402 provide data to central processing module/communications hub 401, as well as to an object detection module 403, which in the illustrated embodiment is implemented by firmware and/or software running on the central processing module/communications hub 401 hardware. In the illustrated embodiment, machine learning object detection module 403 is based on a region proposal network (RPN), which is a fully convolutional network that predicts object bounds and objectness scores at each position. In particular, machine learning detection module 403 is trained end-to-end to generate fast proposals, which are used by fast region-based convolutional neural networks (R-CNN) for object detection. In the illustrated embodiment, the adaptive autopilot and piloting functionalities are incorporated into machine learning object detection module 403.

Machine learning object detection module 403 also operates in conjunction with WiFi radar sensors 404 and WiFi radar module 405, which use wireless signal reflections to localize a person or object behind a wall or other structure, as well as provide additional support for vehicle autonomous collision aversion. Generally, WiFi radar sensors 404 include at least a pair of transmitters and associated transmit antennas capable of transmitting a pair of wireless signals through a wall or other structure, as well as at least a pair of corresponding receivers and receive antennas, which are capable of receiving wireless signals reflected off a person or object behind the wall or structure. These reflected signals are used by WiFi radar module 405 to detect the surfaces and shapes of persons or objects (e.g., guns, other weapons, contraband) within the building or structure.

From training, and data provided by WiFi radar module 405, machine learning object detection module 403 identifies objects first by the perceived shape (e.g., person-shaped, gun-shaped, etc.) and then by supporting data, which could include shapes perceived inside another object, such as the differences between a real gun and a squirt gun, based on characteristics things like internal mechanics, bullets, etc.

In addition to detecting persons or objects behind a wall or other structure, WiFi radar sensors 404 and WiFi radar module 405 support droneside planar mapping. If an array of multiple WiFi sensors 404 is provided, WiFi radar module 405 can implement 3D real-time visualizations of the surfaces of solid objects within the vicinity of the vehicle. From these mappings, 3-dimensional planar perspective views of the vehicle's field of view can be generated and displayed on a holographic visor, such as that described above.

System 400 also includes a facial recognition module 406, which may be based on software available from Keiros AP, Inc. and receives camera data after, or as part of, the WiFi identification of an actual person (as opposed to a manikin.) Facial recognition module 406 processes facial images captured by sensors 402 and compares the resulting image data with data available through public and private records received through central processing module/communications hub 401, such as data from gun registries, Departments of Motor Vehicles, state, federal, and local police agencies, court records, the Veterans Administration, and so on.

An anomaly detection module 407 detects unusual changes or deviations from expected patterns in the information received from navigation sensors 402 and/or WiFi sensors 404. In the one embodiment, anomaly detection module 407 is based on software from Simularity and performs a pixel-by-pixel comparison of image stills from a video feed from navigation sensors 402 and/or composites from planar mapping data obtained through WiFi sensors 404. In some situations, the machine learning object detection module 403 applies the resulting information to make subsequent decisions about the degree of anomaly identified (e.g., if an identified firearm is automatically defined as anomalous, a facial recognition match as a concealed carrier license holder would result in a non-anomalous or less anomalous conclusion.)

In sum, predictive probable cause system 400, when operated in conjunction with an unmanned vehicle, provides significant advantages with regards to protecting law enforcement personnel in the line of duty, as well as protecting the legal rights of the public. Among other things, WiFi radar capabilities allow law enforcement and military personnel to detect the presence of individuals, weapons, and or contraband behind building walls and other structures. Facial recognition capability, along with a wireless connection to public and private databases, allows individuals to be identified. In addition, anomaly detection allows for the detection of unusual patterns of behavior, which may indicate criminal activity.

Figure 5:
FIG. 5 illustrates an example inventory management at a warehouse combined with computerized object identification and recognition, implemented with a remotely controlled UAV, according to an embodiment of the present invention.
Figure 6:
FIG. 6 illustrates another example of combined SLAM with computerized object identification and recognition, implemented with a remotely controlled UAV, according to an embodiment of the present invention.

FIGS. 5-6 further illustrate the predictive probable cause system operated in conjunction with an unmanned vehicle according to embodiments of the present invention. As illustrated in FIG. 5, a remotely controlled UAV 101a performs inventory cycle counting using the system that combines SLAM with computerized object recognition and identification, according to an embodiment of the present invention.

FIG. 6 illustrates another example of combined SLAM with computerized object identification and recognition, implemented with a remotely controlled UAV 101a, according to an embodiment of the present invention. As an example, the system may be applied to the detection and identification of individual(s) in a search and rescue operation.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. An unmanned vehicle comprising:
    wireless mid-range to super-short range radar sensors operating in millimeter-wave and submillimeter-wave frequencies, comprising at least one pair of transmitters with associated transmit antennas and at least one pair of corresponding receivers with receive antennas residing on the vehicle;
        the at least one pair of transmitters transmits wireless signals through a structure for reflecting the wireless signals off an object behind the structure, the at least one pair of corresponding receivers for receiving reflected wireless signals off the object behind the structure, within a sensor field of view of the unmanned vehicle and generating data in response based on the reflected wireless signals that localize the object behind the structure in real time based on the millimeter-wave and submillimeter-waves;
    a vehicle resident predictive probable cause central processing module and communications hub comprising:
        a machine learning object detection module configured with an adaptive autopilot implementing onboard artificial intelligence and piloting system for navigation, and wireless communication data processing circuitry for receiving the data based on the reflected wireless signals that localize the object behind the structure as generated by the wireless radar sensors and analyzing the data with the machine learning object detection module to identify the object behind the structure in real time based on the millimeter-wave and submillimeter-waves; and
    a set of navigation sensors in support of the adaptive autopilot and piloting system, comprising at least one camera that detects objects within a 360 degree field of view around the vehicle, the set of navigation sensors in communication with the central processing module and the machine learning object detection module; and
    wherein the communications hub comprises two-way wireless communications links with off-vehicle user terminals for remote operation of the vehicle.

2. The unmanned vehicle of claim 1, wherein the machine learning object detection module identifies the object by shape.

3. The unmanned vehicle of claim 2, wherein the machine learning object detection module further identifies the object by a second shape perceived inside the object.

4. The unmanned vehicle of claim 1, wherein the object is a human being.

5. The unmanned vehicle of claim 1, wherein the wireless communication data processing circuitry is operable to generate a planar map of at least one surface of the object from the data generated by the wireless radar sensors.

6. The unmanned vehicle of claim 1, wherein the wireless communication data processing circuitry is operable to generate a three dimensional perspective of the object from the data generated by the wireless radar sensors.

7. The unmanned vehicle of claim 1, further comprising:
    at least one imaging device; and
    a facial recognition module for determining an identity of an individual detected by the imaging device.

8. The unmanned vehicle of claim 1, further comprising:
    at least one imaging device; and
    a detection module for detecting changes from an expected pattern in images generated by the imaging device.

* * * * *